US010721845B2

(12) United States Patent
Bhagwat et al.

(10) Patent No.: US 10,721,845 B2
(45) Date of Patent: Jul. 21, 2020

(54) SYSTEM AND METHOD FOR OPTIMIZING COOLING EFFICIENCY OF A DATA CENTER

(71) Applicant: Tata Consultancy Services Limited, Mumbai (IN)

(72) Inventors: Harshad Girish Bhagwat, Pune (IN); Umesh Singh, Pune (IN); Sankara Narayanan D, Chennai (IN); Arun Varghese, Chennai (IN); Amarendra Kumar Singh, Pune (IN); Rajesh Jayaprakash, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 295 days.

(21) Appl. No.: 15/027,134

(22) PCT Filed: Sep. 30, 2014

(86) PCT No.: PCT/IB2014/064945
§ 371 (c)(1),
(2) Date: Apr. 4, 2016

(87) PCT Pub. No.: WO2015/049628
PCT Pub. Date: Apr. 9, 2015

(65) Prior Publication Data
US 2016/0249487 A1  Aug. 25, 2016

(30) Foreign Application Priority Data
Oct. 4, 2013  (IN) .......................... 3158/MUM/2013

(51) Int. Cl.
*G05B 13/00*   (2006.01)
*H05K 7/20*    (2006.01)
(Continued)

(52) U.S. Cl.
CPC ....... *H05K 7/20836* (2013.01); *G05B 13/041* (2013.01); *G06F 1/20* (2013.01);
(Continued)

(58) Field of Classification Search
CPC ..... G05B 13/041; G06F 1/20; G06F 17/5009; G06F 17/5018; H05K 7/20745; H05K 7/20836
(Continued)

(56) References Cited

U.S. PATENT DOCUMENTS

2004/0240514 A1  12/2004  Bash et al.
2007/0038414 A1*  2/2007  Rasmussen ............. G06F 1/206
                                                 703/1

(Continued)

*Primary Examiner* — Brook Kebede
(74) *Attorney, Agent, or Firm* — Finnegan, Henderson, Farabow, Garrett & Dunner LLP

(57) ABSTRACT

Disclosed is a system and method for optimizing cooling efficiency of a data center is disclosed. The system may comprise an importing module, a Computational fluid dynamics (CFD) modeling module, a scope determination module, a metrics computation module, an identification module and a recommendation module. The importing module may be configured to import data associated to the data center. The CFD modeling module may be configured to leverage an external CFD Analysis tool in order to develop a CFD model of the data center. The scope determination module may be configured to determine a scope for optimizing the cooling efficiency of the data center. The metrics computation module may be configured to compute metrics based upon the data. The identification module may be configured to identify inefficiency and a cause producing the inefficiency. The recommendation module may be configured to facilitate optimizing cooling efficiency of the data center.

11 Claims, 7 Drawing Sheets

(51) Int. Cl.
*G06F 1/20* (2006.01)
*G06F 30/20* (2020.01)
*G06F 30/23* (2020.01)
*G05B 13/04* (2006.01)
*G06F 111/10* (2020.01)

(52) U.S. Cl.
CPC .............. *G06F 30/20* (2020.01); *G06F 30/23* (2020.01); *H05K 7/20745* (2013.01); *G06F 2111/10* (2020.01)

(58) Field of Classification Search
USPC .......................... 700/276, 300; 705/7, 8, 10
See application file for complete search history.

(56) References Cited

U.S. PATENT DOCUMENTS

| | | | |
|---|---|---|---|
| 2009/0138313 A1* | 5/2009 | Morgan | G06Q 10/06 705/7.23 |
| 2009/0326879 A1* | 12/2009 | Hamann | G06F 1/206 703/2 |
| 2010/0312415 A1 | 12/2010 | Loucks | |
| 2011/0077795 A1* | 3/2011 | VanGilder | G06F 1/206 700/300 |
| 2012/0158387 A1 | 6/2012 | VanGilder et al. | |

* cited by examiner

SYSTEM AND METHOD FOR OPTIMIZING COOLING EFFICIENCY OF A DATA CENTER

PRIORITY CLAIM

This application is a U.S. National Stage Filing under 35 U.S.C. § 371 and claims priority from International Application No. PCT/IB2014/064945, filed on Sep. 30, 2014, which application claims priority under 35 U.S.C. § 119 from India Application No. 3158/MUM/2013, filed on Oct. 4, 2013. The entire contents of the aforementioned application are incorporated herein by reference.

TECHNICAL FIELD

The present subject matter described herein, in general, relates to a data center, and more particularly to a system and method for optimizing cooling efficiency of a data center.

BACKGROUND

A typical data center may contain Information Technology (IT) equipments including servers, telecommunication equipments, networking equipments, switches and the like. The IT equipments may be arranged on racks or frames in the data center. The IT equipments may generate heat as a result of being utilized for processing of various actions and tasks. The heat generated by the IT components may therefore need to be compensated in order to avoid heating or generating a hot-spot in the data center. The IT equipments may be cooled using cooling units such as computer room air conditioners (CRAG) or computer room air handlers (CRAH), wherein each of these cooling units may be deployed in the data center. The CRAC may be at least one of a return-air controlled CRAC, supply controlled CRAC and the like. Further, the cooling of the IT equipments may also be achieved using advanced cooling units such as in-row coolers, rear door coolers, liquid cooled cabinets and chip cooling techniques.

Data centers consume huge amount of energy in operation. Hence, data center owner strives to reduce energy bills. Cooling units constitute to a major portion of this energy. The cooling of the data center by the computer room air conditioners (CRAC) or the computer room air handlers (CRAH) may depend on various factors associated with design and operational parameters of the data center. The heating conditions may be varied due to variance in the load conditions on the equipments in the data center. The variance in the heating conditions may therefore lead to control the air supply of the cooling units such that data center does not enter into the hot-spot state. However, since there are numerous challenges in identifying exact design and operational parameters variances leading to the hot-spot, the cooling units employed may not be adapted effectively in order to cool the data center. Therefore, the data center may either be over-cooled on under-cooled and hence the cooling efficiency of the data center may be affected. Therefore, the current data center centers may face a problem of optimum cooling and thereby leading to high cooling costs and wastage of energy resources.

There is always possibility of optimizing cooling efficiency by making large changes in cooling infrastructure. For example, optimizing layout of the data center, installing latest cooling units like rear-door heat exchangers may improve cooling efficiency substantially. But all these large changes require huge capital investment and also downtime. Moreover, data centers are allowed to have very little downtime. Hence, data center owner always looks for simpler and cheaper methods of improving cooling efficiency. One of the common methods is making small gradual changes in current cooling infrastructure but still gain significant savings in the operational costs.

SUMMARY

Embodiments of the present disclosure present technological improvements as solutions to one or more of the above-mentioned technical problems recognized by the inventors in conventional systems. For example, in one implementation, a system for optimizing cooling efficiency of a data center is disclosed. In one aspect, the system may comprise a processor and a memory coupled to the processor for executing a plurality of modules present in the memory. The plurality of modules may further comprise an importing module, a Computational fluid dynamics (CFD) modeling module, a scope determination module, a metrics computation module, an identification module and a recommendation module. The importing module may be configured to import data associated to the data center. The data may comprise a design parameter of the data center and an operational parameter of the data center. The CFD modeling module may be configured to leverage a Computational fluid dynamics (CFD) analysis tool to develop a Computational fluid dynamics (CFD) model of the data center based upon the data. The CFD model may be developed for various scenarios generated based upon various combinations within the data. The metrics computation module may be configured to compute a first set of metrics for the data center based upon the data and the CFD model. The metrics computation module may be configured to compute a second set of metrics based upon the operational parameter. The scope determination module may be configured to compare the first set of metrics with reference metrics. The reference metrics may be associated with a reference data center undergone cooling optimization analysis of similar type. Further, the scope determination module may be configured to determine a scope for optimizing the cooling efficiency of the data center based upon the comparison of the first set of metrics with the reference metrics. The identification module may be configured to compare the second set of metrics with threshold values of the data center. Further, the identification module may be configured to identify inefficiency associated with current state of the data center based upon the comparing of the second set of metrics with the threshold values. Furthermore, the identification module may be configured to determine a cause producing the inefficiency based upon the data and the inefficiency. The recommendation module may be configured to facilitate optimizing the cooling efficiency of the data center based upon the inefficiency and the cause.

In another implementation, a method for optimizing cooling efficiency of a data center is disclosed. The method may comprise one or more steps performed via a processor using instructions stored in a memory. The method may comprise importing data associated to the data center. The data may comprise a design parameter of the data center and an operational parameter of the data center. The method may comprise developing a Computational fluid dynamics (CFD) model of the data center based upon the data. The CFD model may be developed for various scenarios generated based upon various combinations within the data. The method may comprise computing a first set of metrics for the data center based upon the data and the CFD model. Further, the method may comprise comparing the first set of metrics with reference metrics. The reference metrics may be associated with a reference data center undergone cooling efficiency optimization analysis of similar type. Further, the method may comprise determining a scope for optimizing the cooling efficiency of the data center based upon the comparison of the first set of metrics with the reference metrics. The method may comprise computing a second set of metrics based upon the operational parameter. The method may comprise comparing the second set of metrics with threshold values of the data center. Further, the method may comprise identifying inefficiency associated with current state of the data center based upon the comparing of the second set of metrics with the threshold values. Furthermore, the method may comprise determining a cause producing the inefficiency based upon the data and the inefficiency. The method may further comprise facilitating optimizing cooling efficiency of the data center based upon the inefficiency and the cause.

In yet another implementation, a non transitory computer program product having embodied thereon a computer program for optimizing cooling efficiency of a data center is disclosed. The computer program product may comprise instructions for importing data associated to the data center. The data may comprise a design parameter of the data center and an operational parameter of the data center. The computer program product may comprise instructions for developing a Computational fluid dynamics (CFD) model of the data center based upon the data. The computer program product may leverage a Computational fluid dynamics (CFD) analysis tool to develop a Computational fluid dynamics (CFD) model of the data center based upon the data. The CFD model may be developed for various scenarios generated based upon various combinations within the data. The computer program product may comprise instructions for computing a first set of metrics for the data center based upon the data and the CFD model. Further, the method may comprise comparing the first set of metrics with reference metrics. The reference metrics may be associated with a reference data center undergone cooling efficiency optimization analysis of similar type. Further, the computer program product may comprise instructions for determining a scope for optimizing the cooling efficiency of the data center based upon the comparison of the first set of metrics with the reference metrics. The computer program product may comprise instructions for computing a second set of metrics based upon the operational parameter. The computer program product may comprise instructions for comparing the second set of metrics with threshold values of the data center. Further, the computer program product may comprise instructions for identifying inefficiency associated with current state of the data center based upon the comparing of the second set of metrics with the threshold values. Furthermore, the computer program product may comprise instructions for determining a cause producing the inefficiency based upon the data and the inefficiency. The computer program product may further comprise instructions for facilitating optimizing the cooling efficiency of the data center based upon the inefficiency and the cause.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
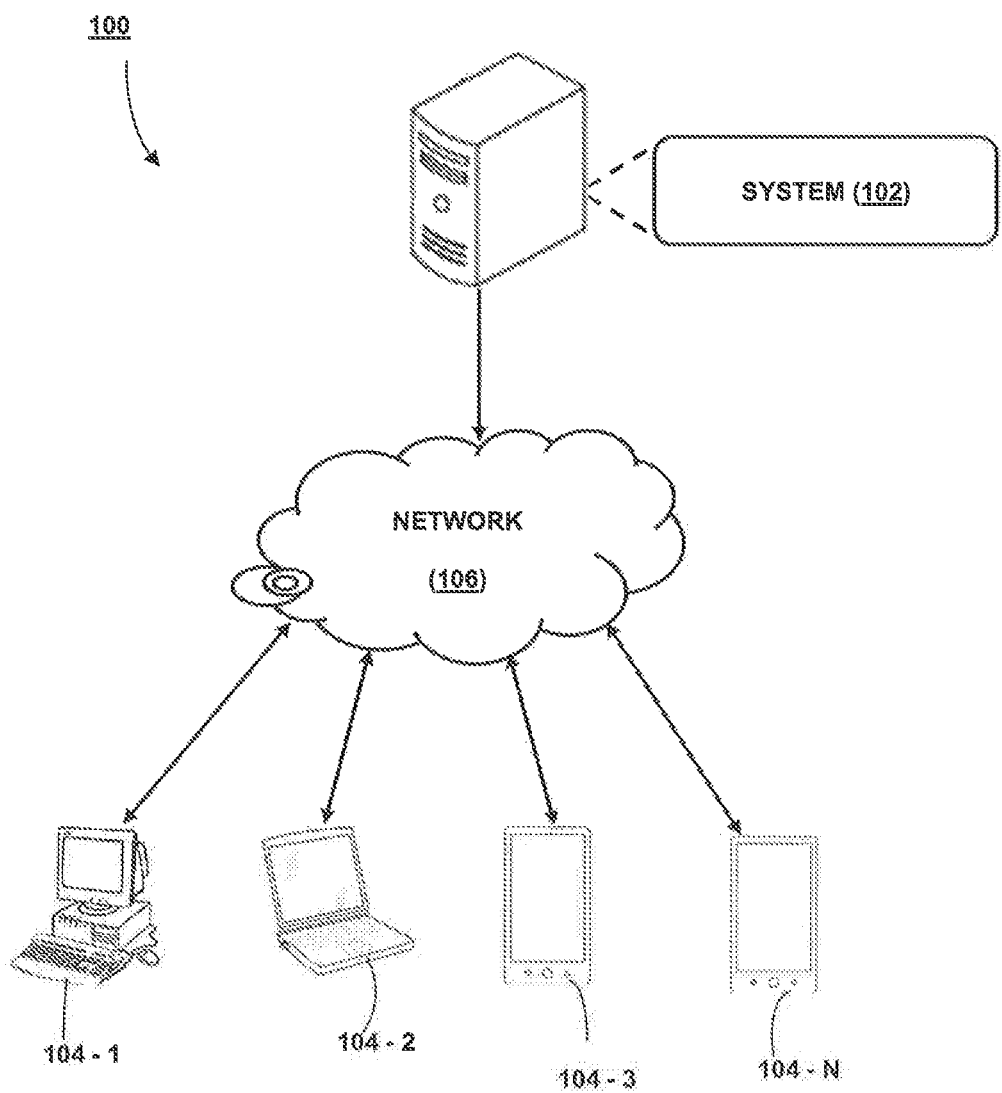
FIG. 1 illustrates a network implementation of a system for optimizing cooling efficiency of a data center, in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for optimizing cooling efficiency of a data center are described. In one aspect, data associated to the data center may be received. The data may comprise a design parameter of the data center and an operational parameter of the data center. In one example, the data design parameter may include information on layout of the data center, information on equipments of the data center, information regarding racking practices in the data center, location of the data center and the like. Further, the operational parameter of the data center may include power consumption of equipments in the data center, operational parameter of the equipments in the data center, temperature and air velocity at various locations of the data center, ambient temperature outside the data center, electricity cost per unit, and the like. It should be noted to an ordinary skill person skilled in the art that, in addition to the above disclosed design parameter and the operational parameter; the data may comprise other design parameters and operational parameters associated with the data center.

Subsequent to the receipt of the data, a Computational fluid dynamics (CFD) analysis of the data center may be performed by using CFD Analysis tool known in the art. In one example, the CFD analysis may be performed on the data using CFD software such as Ansys® CFX, Ansys® Fluent and OpenFOAM® etc. The CFD analysis may enable developing a Computational fluid dynamics (CFD) model of the data center. The CFD model may be developed for various scenarios within the data. In one example, the scenarios may be generated for various combinations of the operational parameters of cooling units of the data center such on/off status, supply temperature, flow rate, power consumption of racks and the like. The CFD model may output information regarding a temperature and flow profiles in the data center for all the scenarios. The information may also contain colored plots of temperature and velocity of air in data center, table of mass flow of air coming out from tiles etc. In a specific embodiment, CFD model of under floor plenum may be developed. The data output from the CFD model for this embodiment is flow rates of tiles for various scenarios.

Subsequent to the developing of the CFD model, the data and the CFD model may be analyzed to compute a first set of metrics. In one example, the first set of metrics may indicate leakage area in the data center, maximum temperature of each rack, power consumed by each equipment, plenum blockage, flow rate of tiles, maximum and minimum values of set points of cooling equipments, ratio of cooling capacity of the data center and heat generated in the data center and average ambient temperature etc. In one embodiment, the first set of metrics may be computed by dividing the data center into one or more sections such that each section contains one aisle. Further, few of the first set of metrics may be computed for each of the sections of the data center.

After computing the first set of metrics, the first set of metrics may be compared with reference metrics associated with reference data centers undergone similar type of cooling efficiency optimization. Based upon the comparison of the first set of metrics with the reference metrics, a scope for optimization of the cooling efficiency may be determined. The scope may be determined in terms of "energy savings" in the cooling of the data center. The comparison provides a match set of reference data centers. Ranges of achievable values for the first set of metrics may be derived based on the "after optimization" values of the first set of metrics from the match set of reference data centers. The "energy savings" may be calculated using these ranges. In one example, using current value of a metric "Power-Usage Efficiency" (PUE), current cooling power consumption, achievable PUE, and electricity cost per unit, the scope of annual savings in cooling power in terms of local currency may be determined.

Subsequent to the determination of the scope, a second set of metrics may be determined. The second set of metrics may be determined based on the operational parameter of the data center. In one example, the second set of metrics may comprise at least one of a rack inlet temperature, a tile temperature, rack threshold temperature and a combination thereof. The rack inlet temperature may be associated with a rack. The tile temperature may be associated with a tile placed around the rack. Further, the rack threshold temperature is associated with safe operation of equipment inside the rack. The second set of metrics may be compared with pre-defined threshold values of the data center in order to identify inefficiency in the current state of the data center. In one example, each of the rack inlet temperature, the tile temperature, and the rack threshold temperature are compared with their respective pre-defined threshold values in order to identify the inefficiency in the current state of the data center. Further, after identification of the inefficiency, a cause for the inefficiency may be determined. The determination of the cause may be based upon the data and the inefficiency. Further, for each cause, a sub-cause may be determined.

After determination of the cause and the sub-cause, a recommendation may be provided based on the inefficiency, the cause and the sub-cause. The recommendation may suggest a gradual change in at least one of the design parameter of the data center and the operational parameter of the data center. In one aspect, the gradual change recommended may be feasible to be implemented easily and at low cost. The recommendation may be provided in form of a recommendation report depicting the inefficiency, the cause, the sub-cause, the recommendation and the scope for the optimizing the cooling efficiency of the data center. Further, in one embodiment, the recommendation report may be displayed to the user on a user interface. The user interface may further be configured to display a layout of the data center, wherein a section of the layout may be indicated by a color or heat-map depicting the inefficiency identified in the current state of the data center. Further, the user interface may be configured in a manner such that both: the section depicting the inefficiency and the recommendation corresponding to the inefficiency, are displayed simultaneously on the user interface. Further, the user interface may provide one or more options to the user to view recommendations corresponding to inefficiencies, causes and sub-causes selected by the user. The recommendations generated may facilitate in the optimization of the cooling efficiency of the data center. In one embodiment, few of the recommendations may be implemented in real time while others may be implemented over a specified periodic time interval. In one example, the recommendation of changing/modifying a set of point of a specific CRAC may be implemented in the real time. On the contrary, the recommendation to change position of a tile may require time.

While aspects of described system and method for optimizing cooling efficiency of the data center may be implemented in any number of different computing systems, environments, and/or configurations, the embodiments are described in the context of the following exemplary system.

Referring now to FIG. 1, a network implementation 100 of a system 102 for optimizing cooling efficiency of a data center is disclosed. The system 102 may import data associated to the data center. The data may comprise a design parameter of the data center and an operational parameter of the data center. The system 102 may develop a Computational fluid dynamics (CFD) model of the data center based upon the data using a CFD software/external CFD Analysis tool. The CFD model may be developed for various scenarios generated based upon various combinations within the data. The system 102 may compute a first set of metrics for the data center based upon the data and the CFD model. Further, the system 102 may compare the first set of metrics with reference metrics. The reference metrics may be associated with a reference data center. Further, the system 102 may determine a scope for optimizing the cooling efficiency of the data center based upon the comparison of the first set of metrics with the reference metrics. The system 102 may compute a second set of metrics based upon the operational parameter. The system 102 may compare the second set of metrics with threshold values of the data center. Further, the system 102 may identify inefficiency associated with current state of the data center based upon the comparing of the second set of metrics with the threshold values. Furthermore, the system 102 may determine a cause producing the inefficiency based upon the data and the inefficiency. The system 102 may further facilitate optimizing the cooling efficiency of the data center based upon the inefficiency and the cause.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, a Smartphone, a Tablet Computer and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
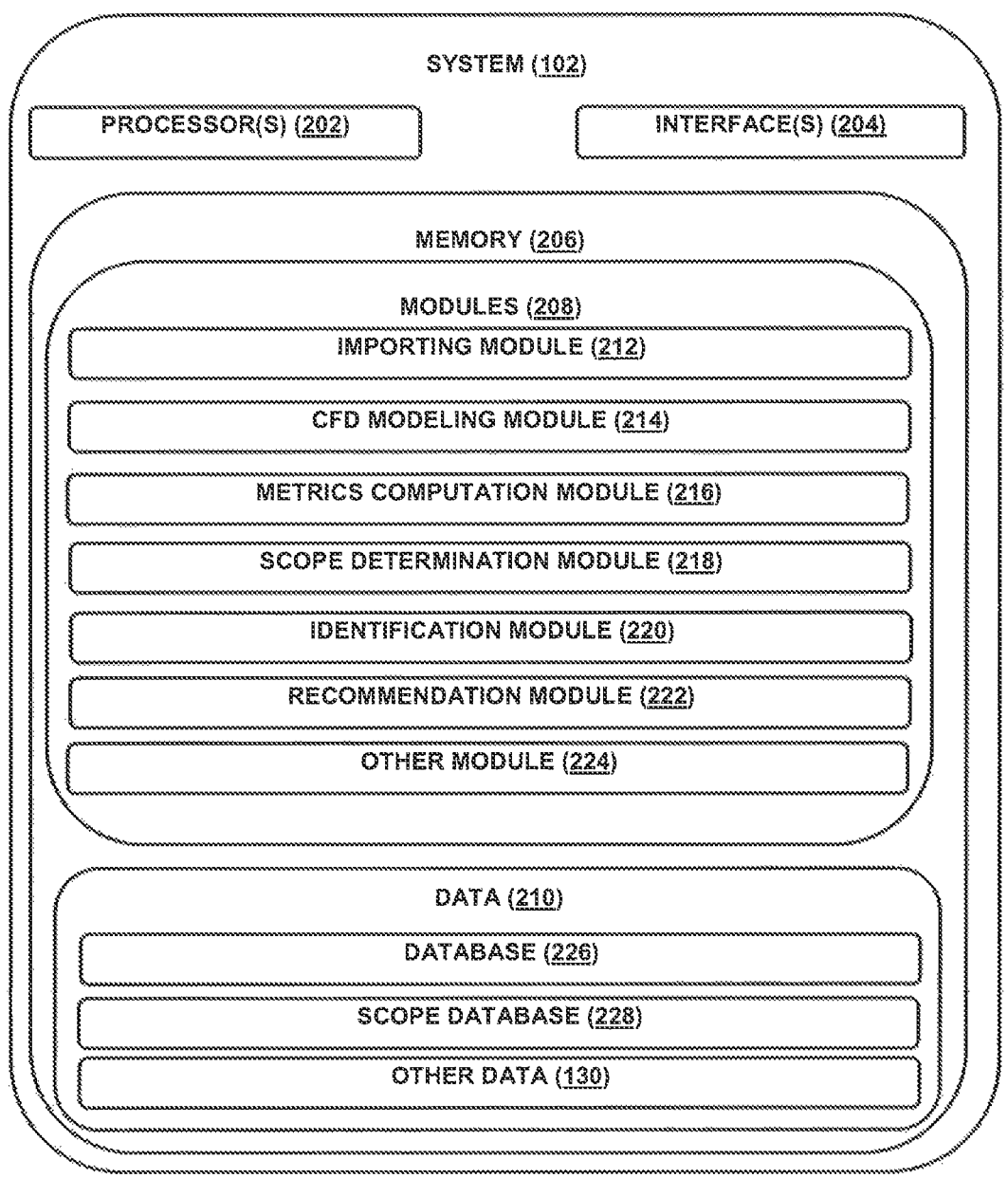
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an importing module 212, a CFD modeling module 214, a metrics computation module 216, a scope determination module 218, an identification module 220, a recommendation module 222 and other module 224. The other modules 224 may include programs or coded instructions that supplement applications and functions of the system 102. The modules 208 described herein may be implemented as software modules that may be executed in the cloud based computing environment of the system 102.

The data 210, amongst other things, serves as a repository for storing data processed, received, and generated by one or more of the modules 208. The data 210 may also include a database 226, a scope database 228 and other data 130. The other data 130 may include data generated as a result of the execution of one or more modules in the other module 220.

Figure 3:
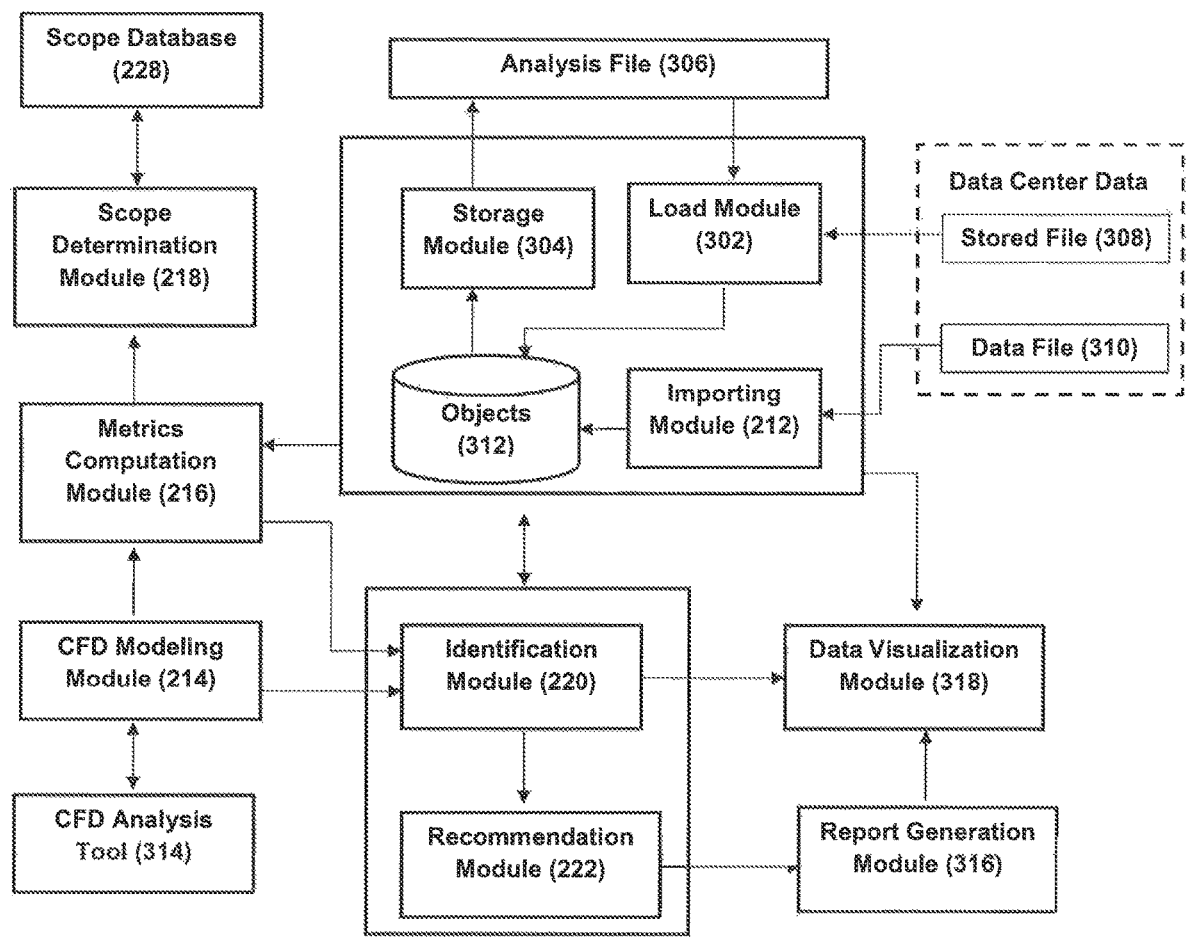
FIG. 3 illustrates various modules of the system, in accordance with an embodiment of the present subject matter.
Figure 3:
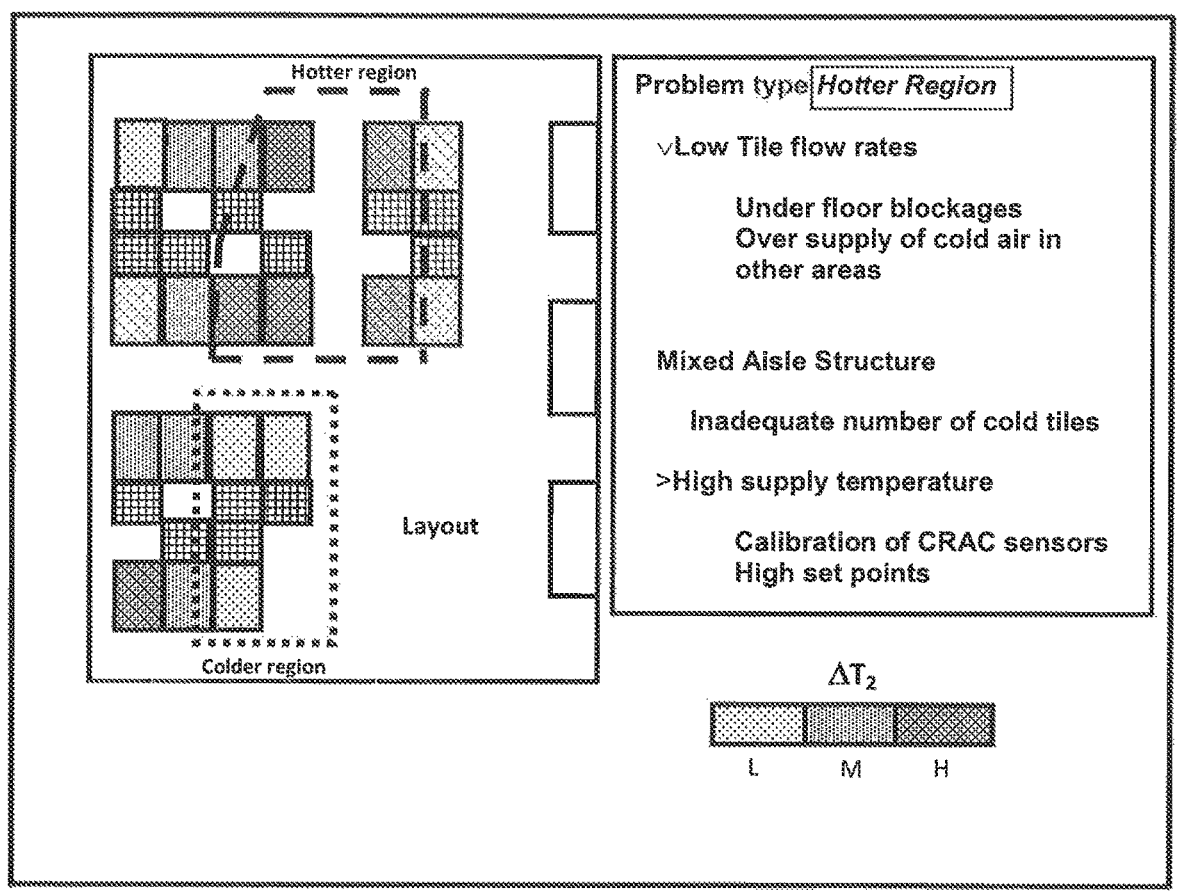

In one implementation, at first, a user may use the client device 104 to access the system 102 via the I/O interface 204. The user may register themselves using the I/O interface 204 in order to use the system 102. The working of the system 102 may be explained in detail in FIGS. 3, 4, 5, and 6 explained below. Referring to FIG. 3, a detailed working of various modules along with other components of the system 102 is illustrated, in accordance with an embodiment of the present subject matter.

Importing Module 212

In one embodiment, the functionalities of the importing module 212 have been described referring to FIG. 3. The importing module may be configured to import data associated to the data center. The data imported may be related to design and operational parameters of the data center. As illustrated, the data may be imported from a data file 310 by the importing module 212. In one example, the data file 310 may be of ".csv" format. The data imported may comprise information on layout of the data center. In one example, the information on the layout may include placement of CRACs, racks, perforated tiles on raised floor as well as false ceiling, PDU, columns. Further, the information on the layout may include blockages inside under-floor plenum and cutouts in raised floor. The data may further comprise information on equipments of the data center. In one example, the information on the equipments may include inventory details such as Manufacturer's information such as model number of CRAC, and IT equipment etc. The data may further comprise information regarding racking practices including placement of glass doors, openings in racks, placement of equipment inside racks, air flow configuration (position of inlet and outlets of servers). Further, the data may comprise power consumed by IT equipments, power consumed by cooling equipments, and the total power consumed by the data center. Additionally, the data may comprise temperature and air velocity measured at various locations of the data center. In one example, the locations at which the temperature and the air velocity measured may include inlet of racks, perforated tiles, supply and return of CRAC. The air velocity and the temperature data may depend on the CRAC on/off status and the set-points of the CRAC. These parameters may change frequently during day-to-day operation of the data center. Hence, the data imported may comprise separate measurements for all such scenarios. Further, the data may comprise details such as location of data center, ambient temperature outside the data center over a specific time interval and electricity cost per unit. It should be noted to a person ordinary skill in the art that the data imported may include other information associated with the design and operational parameters of the data center. The importing module 212 may be configured to read the data file 310, and convert the data file 310 into a format required for the analysis of the data. In one example, the data file 310 may be converted into one or more objects 312 as illustrated.

CFD Modeling Module 214

After the data is imported by the importing module 212, the data may be analyzed using a CFD modeling module 214. The CFD modeling module 214 may be configured to retrieve relevant information required for CFD analysis from the data. Further, the CFD modeling module may transmit the information retrieved for analysis to a CFD Analysis tool 314, as illustrated in FIG. 3. The CFD Analysis tool 314 may be open source/commercially available software capable for performing CFD calculations based upon the information received from the CFD modeling module 214. The CFD modeling module 214 may therefore leverage the CFD Analysis tool 314 in order to develop a CFD model of the data center. The model of the data center may be developed for various scenarios, wherein each scenario may be generated based upon various combinations within the data. In one example, these scenarios may be generated for various combinations of CRAC parameters like on/off status, CRAC supply temperature and flow rate and power consumption of racks. After performing the CFD calculations, the CFD modeling module 214 may receive output of the calculations for the various scenarios. This information may contain information regarding temperature and flow profiles in the data center for all the scenarios. The information may also contain colored plots of temperature and velocity of air in data center, table of mass flow of air coming out from tiles etc. In some embodiments, the data output from the CFD model of the data center may comprise information on flow rates of tiles for the various scenarios. The CFD modeling module 214 may transmit data output from the CFD model of the data center and relevant data to a metrics computation module 216 and an identification module 220 for further analysis.

Metrics Computation Module 216

Subsequent to the development of the CFD model of the data center, a first set of metrics and a second set of metrics associated with the current state of the data center may be computed using a metrics computation module 216 shown in FIG. 3. The metrics computation module 216 may retrieve relevant information from the data and the CFD model of the data center to in order to compute the first set of metrics. Specifically, the metrics computation module 216 may receive the relevant information and the inventory information of the servers and cooling units in the data center from the database 226 in order to compute the first set of metrics. Based upon the relevant information received from the inventory information, and the data, the metrics computation module 216 may compute the first set of metrics listed below, in accordance to an embodiment of the present subject matter.

Power usage effectiveness (PUE): PUE may be the ratio of total data center facility power and power consumed by computing (IT) equipment.

Lumped ratio: Lumped ratio may be the ratio of cooling capacity to cool the data center to the heat generation in the data center. The cooling capacity sum of capacities of running CRAC or all installed CRAG. The heat generation can be the actual or maximum.

RMax: RMax may be the maximum of temperature measured at rack inlets.

% leakage area: This metric may indicate the percentage ratio of leakage area to the total area of the data center.

% plenum blockage: It may indicate the percentage ratio of plenum volume blocked by under-floor blockage to the volume of the plenum.

Racks opening factor: It is the percentage of open frontal area to the total frontal area of rack averaged over all racks.

Flow availability factor: A ratio of sum of flow rates of tiles in an aisle to flow requirement of racks in the same aisle. This ratio may be calculated for all aisles. Flow availability factor may be the average of all such ratios calculated for all the aisles in the data center.

Max (Set-point) and Min (Set-point): These are maximum and minimum values of temperature set-points of CRACs.

Sq.ft. area of under floor plenum: It is calculated from the layout of the data center.

Average ambient temperature: It is the average of ambient temperature at the location of the data center over a specified time period.

In one embodiment, influence indices may be calculated for CRAC, racks and tiles. The influence indices may be calculated using a method disclosed in an Indian patent application 652/MUM/2011 and U.S. patent application, Ser. No. 13/234,763 titled "Method and system for thermal management by quantitative determination of cooling characteristics of data center" (incorporated herein as a reference). In some embodiments, few of the first set of metrics may be computed by dividing the data center into different sections such that each section may contains only one aisle. Then, the few of the first set of metrics including % leakage area and % plenum blockage may be computed for each of the sections. It should be noted to a person ordinary skill in the art that the above disclosed first set of metrics are exemplary and is not intended to limit the scope of the appended claims, and other metrics in addition to the above may be computed based upon the data and the analysis of the data center.

In one embodiment, the metrics computation module 216 may further be configured to compute the second set of metrics based upon the operational parameters of the data center. In one example, the second set of metrics may comprise temperature meta computed based on operational parameters associated with the temperatures measured at inlet of racks, tiles and threshold value of temperatures associated with safe operation of the data center. In this scenario, the second set of metrics computed may be as follows:

$$\Delta T_1 = T_{Rack} - T_{Tile} \quad (1)$$

$$\Delta T_2 = T_{Rack} - T_{Threshold} \quad (2)$$

Where $T_{Rack}$ may indicate temperature measured at the inlet of the racks, $T_{Tile}$ may indicate temperature measured at the tiles, and $T_{Threshold}$ may indicate temperature recommended by manufacturers of the IT equipment residing in the rack as maximum temperatures at which safe operation of the IT equipment is ensured. The second of metrics, for example, $\Delta T_1$ and $\Delta T_2$ may be used for analyzing the inefficiency in the current state of the data center, it should be noted to a person ordinary skilled in the art that though the second set of metrics $\Delta T_1$ and $\Delta T_2$ as disclosed may be computed, the present disclosure is not limited to compute only the said metrics and additional metrics based upon the operational parameters associated with the data center may be computed. In some embodiments, the second set of metrics may be analyzed by an identification module 220 for identifying the inefficiency in the current state of the data center.

Scope Determination Module 218

Subsequent to the determination of the first set of metrics, the scope determination module 218 may compare the first set of metrics with reference metrics stored in a scope database 228. In an embodiment, the scope database 228 may be configured for storing the reference metrics associated to reference data centers. In one example, the scope database 228 may comprise reference metrics like PUE, area, % leakage, etc. of the reference data centers before and after optimization. The reference data centers are the data centers for which similar type of cooling optimization has been performed. For the determining of the scope, the scope determination module 218 may compare the first set of metrics with the reference metrics from the scope database 228 to obtain matching reference data centers. Further, the scope determination module 218 may determine ranges of achievable values for the first set of metrics based on "after optimization" values of the reference metrics of the matching reference data centers. After the determination of achievable values, savings may then be calculated using these ranges. In one example, using "as-is" PUE, "as-is" cooling power consumption, achievable PUE and electricity cost per unit, the scope of annual savings in cooling power in terms of local currency may be determined.

In one embodiment, the matching of the first set of metrics with the reference metrics in the scope database 228 may be implemented by the scope determination module 218. In this embodiment, weights may be assigned to each of the first set of metrics based upon significance or weightage to be given to a specific metric for finding a match. The weights may be assigned in a manner such that the sum of the weights for all the first set of metrics should be one. In this embodiment, assuming a dataset comprises all the first set of metrics that need to be matched against the corresponding reference metrics in the scope database 228. In the dataset, the difference between a metric to be matched and the reference metric in the scope database 228 may be calculated for each of the reference data centers in the scope database 228. These difference values for the metric are then normalized by dividing them by the maximum of these difference values. This normalization may be repeated for all the first set of metrics in the dataset to be matched. These metrics normalized may be weighted using the corresponding weights. Euclidean distance metric may be calculated between each of these normalized metrics and datasets weighted and a reference point. A reference datacenter in the scope database 228 may be considered as the closest match when the reference data center results in the least Euclidean distance between the dataset to be matched. Alternatively, reference datacenters within ten percent of the computed metric may also be considered as close matches for the datacenter. Further, based upon the matching, ranges for scope, achievable PUE may be calculated matching reference data centers.

In some embodiments, the scope determination module 218 may indicate whether there is a scope for optimizing the cooling efficiency of the data center. When it may be identified, via the scope determination module 218, there is a scope for optimizing the cooling efficiency, the system 102 may perform further analysis in order to facilitate the optimization of the cooling efficiency using the identification module 220 and a recommendation module 222.

Identification Module 220

Subsequent to the computation of the second set of metrics, the identification module 220 as illustrated in FIG. 3 may be configured to analyze the second set of metrics. In some embodiments, the analysis of the second set of metrics enable in identification of inefficiencies in the data center. Specifically, the inefficiencies in the current state of the data center may be identified by the identification module 220 by comparing the second set of metrics with pre-defined threshold values of the data center. In one example, by comparing the second set of metrics ($\Delta T_1$ and $\Delta T_2$) with few of the pre-defined threshold values, and further based on pre-defined geometrical criteria, the identification module 220 may identify following inefficiency types:

| Inefficiency type | Temperature metric criteria | Geometrical criteria |
|---|---|---|
| Hotter Region | $\Delta T_2 > \Delta T_{2,L}$ | Group of racks, preferable in a single aisle |
| Colder Region | $\Delta T_2 < \Delta T_{2,L}$ | Group of racks, preferable in a single aisle |
| Hot Spot | $\Delta T_2 > \Delta T_{2,H}$ | Single rack |
| High HAR | $\Delta T_1 > \Delta T_{1,H}$ | Single rack |

In one embodiment, these inefficiencies may be displayed on the user interface showing layout of the data center using a data visualization module 318, as illustrated in FIG. 3(A). Specifically, the data visualization module 318 may be configured to indicate the inefficiencies identified by the identification module 220 by encircling relevant area and racks on the layout of the data center with different colors depending upon the type and importance of the inefficiencies identified. In one embodiment, the metrics are shown on the user interface as illustrated in the FIG. 3(A). The metrics may be classified into three bands using $\Delta T2,L$, $\Delta T2,H$, $\Delta T1,L$, $\Delta T1,H$ which may be shown appropriately in three distinct colors as shown in the FIG. 3(A). Temperature thresholds $\Delta T2,L$, $\Delta T2,H$, $\Delta T1,1L$, $\Delta T1,H$ may correspond to the pre-defined threshold values of the data center. In one example, following values for the above thresholds may be used:

$\Delta T_{2,L} = -5°$ C.

$\Delta T_{2,H} = -3°$ C.

$\Delta T_{1,L} = +2°$ C.

$\Delta T_{1,H} = +4°$ C.

It should be noted by a person skilled in the art that above disclosed table is exemplary and is not intended to limit the scope of the appended claims. Similar to the above disclosed inefficiency types, other inefficiency types depending on varied operational parameters associated with the data center and other geometrical criteria may be identified.

After identification of the inefficiencies in the current state of the data center, the identification module 220 may further be configured to identify causes and sub-causes for ail the inefficiencies identified. The causes and the sub-causes may be dependent upon the efficiency type. FIG. 3(A) illustrates an example of displaying the causes and the sub-causes corresponding to inefficiency types on the user interface. As illustrated from FIG. 3(A), the causes and the sub-causes are shown in a tree form with root nodes representing the causes and leaf nodes representing the sub-causes. The causes and the sub-causes depend upon type of the data center, type of cooling infrastructure, accuracy and granularity of measurements taken and timeframe of data collection and analysis. After generating and displaying the causes and the sub-causes related to the inefficiencies, the causes and the sub-causes which are appropriate for the data center may be selected by a recommendations module. In one embodiment, the recommendation module may select the appropriate causes and the sub-causes based upon analysis of the data collected, different metrics calculated, and results obtained from the CFD analysis. The causes and the sub-causes appropriately selected may be displayed on the user interface. The functionalities of the recommendation module may be further explained as below:

Recommendation Module 222

Subsequent to the identification of the inefficiencies, the causes and the sub-causes producing the inefficiencies, the recommendation module 222 may configured to select the appropriate causes and sub-causes for the inefficiencies identified in the current state of the data center. Further, based upon the causes and sub-causes for the inefficiencies selected, the recommendation module 222 may be configured for providing recommendations based on the inefficiency types, the causes and the sub-causes. The data visualization module 318 may be configured to display the causes and the sub-causes selected corresponding to the inefficiency type identified by the identification module 220. In one example, the recommendation module 222 may select the causes and the sub-causes and accordingly provide the relevant recommendations as below:

the recommendation module 222. In one embodiment, the recommendations may be indicative of suggestive changes in the design and the operational parameters of the data center. These recommendations may be implemented in order to facilitate the optimization of the cooling efficiency of the data center. Similar recommendation analysis may be performed for all the inefficiencies identified in the current state of the data center. The recommendations may be provided for these inefficiencies based on the recommendation analysis performed. The recommendations may be implemented easily, with low cost without requiring down time as the recommendations are related to gradual changes in the design and operational parameter of the data center. After implementation of these recommendations, the inefficiencies in the current state of the data center may be alleviated, thereby facilitating the optimizing the cooling efficiency of the data center.

In one embodiment, a report generation module 316, as illustrated in FIG. 3 may be configured for generating a recommendation report comprising details of analysis carried out and results of the analysis in terms of inefficiencies identified, associated causes and sub-causes and the recom-

| Inefficiency Type | Causes | Data Displayed on user interface | Sub-causes | Data Displayed on user interface | Criteria for selecting sub-cause | Recommendation |
|---|---|---|---|---|---|---|
| Hotter region | Low tile flow rates | Flow rates through tiles | High under-floor blockages | Blockage and % blockage for different sections | (% blockage for the section near the problem area) >25% | Check if some of the parts blocking the plenum can be permanently removed |
| | | | Oversupply of cold air in other areas | Flow rates through tiles and leakages | (Flow availability factor for other aisles) >2 | Reduce leakage and number of tiles in other aisles |
| | Mixed aisle structure | Air flow configuration of racks | — | — | if all racks in the problem area do not have same airflow configuration | Shift the servers/racks so as to have same airflow configuration |
| | Inadequate number of cold tiles | Flow rates through tiles | — | — | If (number of cold tiles in the problem area/number of racks in the problem area) <0.5 | Add more cold tiles in the problem area |
| | High supply temperature | Supply temperatures of CRAG and temperatures at tiles | Calibration of CRAC sensors | Temperature at CRAC return measured and shown on CRAC display | Abs(Measured-display temperature at influencing CRAC return) >2° C. | Calibrate the sensors from vendor and put calibration activity in maintenance contract |
| | | | High set points | CRAC Set points | Set point of influencing CRAC return >24°C. | Increase set points in small increments and check if this solves the problem |

As shown in the above table, depending upon the inefficiency selected a set of pre-defined causes and sub-causes may be displayed on the user interface. Decisions regarding relevant causes and sub-causes may be selected based upon mendations provided corresponding to the inefficiencies and the scope for the optimization. The report may also contain visual representation of the details of analysis in the form of table, figures, colored plots etc. The report is the outcome of the entire analysis. The report may be displayed on the user interface using the data visualization module 318.

In one embodiment of the present disclosure, the data imported may be stored in the form of the objects 312. Any changes made to the data during the entire optimization analysis may be written to the objects 312. The storage module 302 may enable to save these objects 312 in the memory of the system. The storage module 302 may convert each object into a notation called 'JavaScript Object Notation' (JSON), a lightweight data-interchange format, and may dump the converted information into an analysis file 306. The data saved into the analysis file 306 using the storage module 304 may be converted from the JSON notation into the objects 312 by using the load module 302, enabling to continue data collection from the last time.

Figure 4:
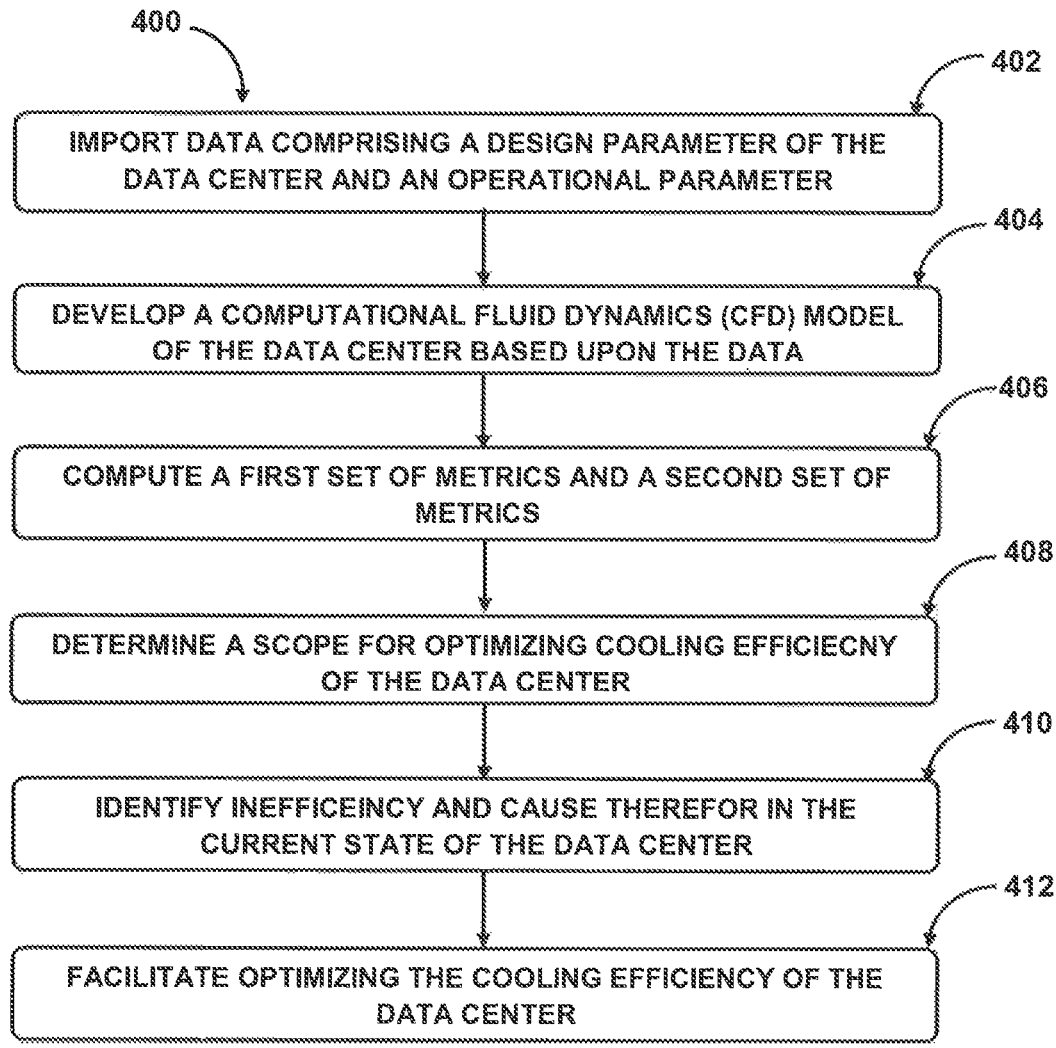
FIGS. 4, 5 and 6 illustrate a method for optimizing cooling efficiency of a data center, in accordance with an embodiment of the present subject matter.

Referring now to FIG. 4, a method 400 for optimizing cooling efficiency of a data center is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, data comprising design and operational parameter of a data center may be imported. In one implementation, the data may be imported using the importing module 212.

At block 404, a CFD model of the data center may be developed. The CFD model may be developed based upon the data. In one implementation, the CFD model may be developed using the CFD developing module 214.

At block 406, a first set of metrics and a second set of metrics may be computed. The first set of metrics may be computed based upon the CFD model and the data. Further, the second set of metrics may be computed based upon operational parameters of the data center. In one implementation, the first set of metrics and the second set of metrics may be computed by using the metrics computation module 216. The first set of metrics and the second set of metrics may be stored in the database 226.

At block 408, a scope for optimizing the cooling efficiency of the data center may be determined. The scope for optimizing the cooling efficiency may be determined using a method 500 as described in FIG. 5. In one implementation, the scope for optimizing the cooling efficiency may be determined by using the scope determination module 218.

At block 410, inefficiency in the current state of the data center may be identified. Further, cause and sub-cause producing the inefficiency may be identified. The identification of the inefficiency, the cause and the sub-cause may be implemented using a method 600 as described in FIG. 6. In one implementation, the inefficiency, the cause and the sub-cause may be identified by using the identification module 220.

At block 412, the optimization of the cooling efficiency of the data center may be facilitated by generating a recommendation based on the inefficiency, the cause and the sub-cause. In one implementation, the optimization of the cooling efficiency of the data center may be facilitated by using the recommendation module 222.

Figure 5:
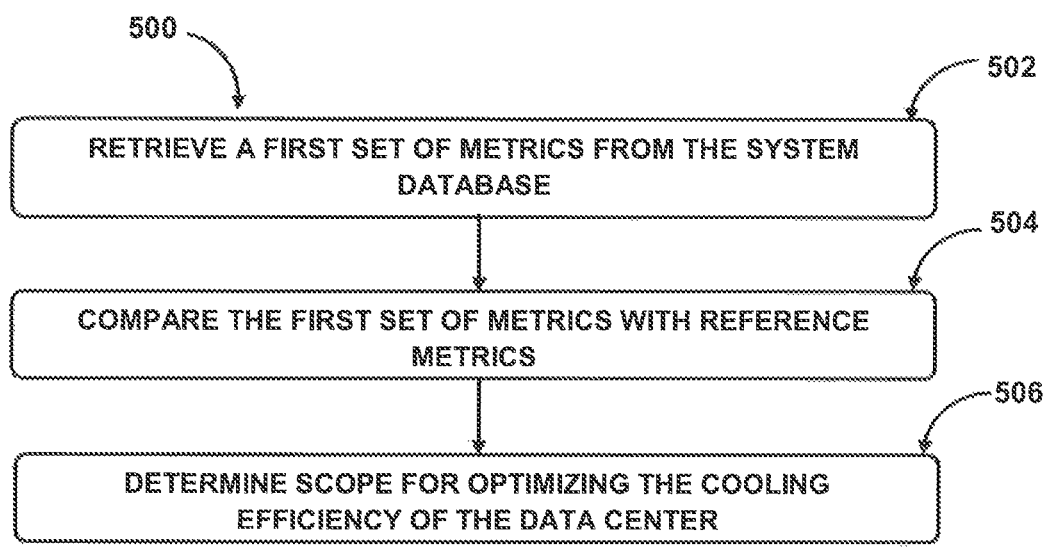

Referring now to FIG. 5, a method 500 for the determination of scope for optimizing the cooling efficiency of a data center is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 502, the first set of metrics may be retrieved from the database 226. In one implementation, the scope determination module 218 may retrieve the first set of metrics from the database 226.

At block 504, the first set of metrics may be compared with reference metrics stored in a scope database 228.

At block 506, the scope for optimizing the cooling efficiency of the data center may be determined. The scope for optimizing the cooling efficiency may be determined based on the comparison of the first set of metrics with the reference metrics.

Figure 6:
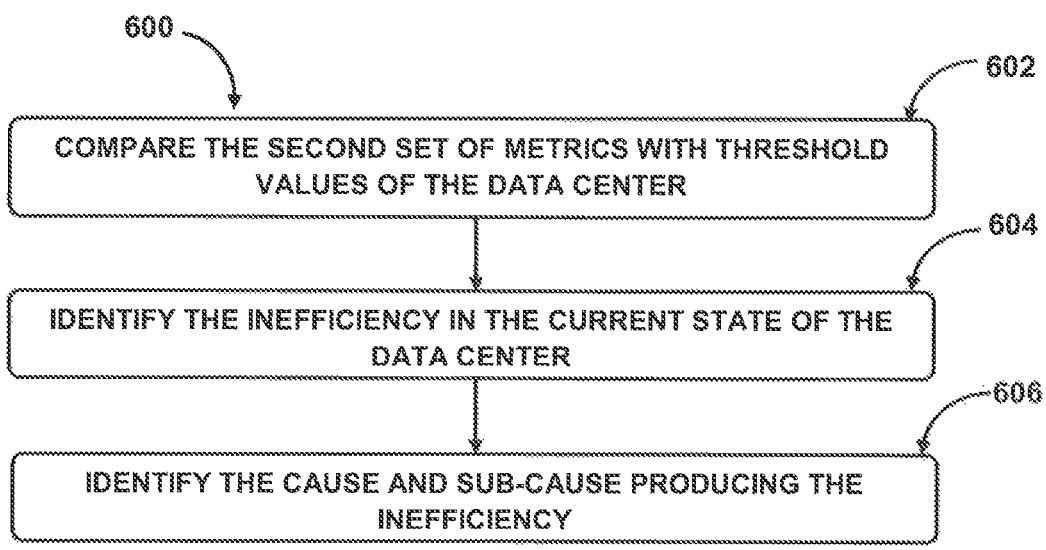

Referring now to FIG. 6, a method 600 for the determination of scope for optimizing the cooling efficiency of a data center is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the system 102.

At block 602, the second set of metrics may be compared with threshold values of the data center.

At block 604, the inefficiency in the current state of the data center may be identified based on the comparing of the first set of metrics with the threshold values of the data center.

At block 606, the cause and the sub-cause producing the inefficiency may be determined based on the inefficiency and the data.

Although implementations for methods and systems for the optimization of the cooling efficiency of the data center have been described in language specific to structural features and/or methods, it is to be understood that the appended claims are not necessarily limited to the specific features or methods described. Rather, the specific features and methods are disclosed as examples of implementations for optimizing the cooling efficiency of the data center.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimizing cooling efficiency of a data center, the method comprising:
  importing data comprising a design parameter of the data center and an operational parameter of the data center;
  developing, via a processor, a Computational fluid dynamics (CFD) model of the data center based upon the data, wherein the CFD model is developed using CFD analysis tool capable of performing CFD calculations based upon the information retrieved from the imported data for various scenarios generated based upon various combinations within the data;
  computing, via the processor, a first set of metrics for the data center based upon the data and the CFD model, wherein computing the first set of metrics comprises:
    dividing the data center into a plurality of sections, wherein each of the plurality of sections comprises an aisle; and
    computing the first set of metrics for each of the plurality of sections based upon the data and the CFD model, wherein the first set of metrics include leakage area in the data center, maximum temperature of racks in the data center, power consumed by equipment in the data center, plenum blockage, flow rate of tiles, maximum and minimum values of set points of cooling equipment, ratio of cooling capacity of the data center and heat generated in the data center and an average ambient temperature;
  comparing via a processor the first set of metrics with reference metrics, where cooling efficiency optimization has been performed, wherein the comparison provides a match set of reference data centers, and wherein ranges of achievable values for the first set of metrics is derived based on after-optimization values of the reference metrics of the match set of the reference data centers, wherein the reference metrics are associated with a reference data center;
  determining, via the processor, a scope for optimizing the cooling efficiency of the data center based upon the comparison of the first set of metrics with the reference metrics, wherein the scope is determined in terms of energy savings in the cooling of the data center;
  computing, via the processor, a second set of metrics based upon the operational parameter;
  comparing via a processor the second set of metrics with threshold values of the data center;
  identifying inefficiency associated with current state of the data center based upon the comparing of the second set of metrics with the threshold values and geometrical criteria of the data center;
  determining a cause producing the inefficiency, wherein the cause is determined based upon the data and the inefficiency;
  recommending, via a processor, based on the inefficiency and the cause, wherein the recommendation is indicative of suggesting a gradual change in at least one of the design parameter of the data center and the operational parameter of the data center;
  displaying the recommendation report and the layout of the data center, wherein at least one section of the layout visually indicates the inefficiency identified; and facilitating optimizing cooling efficiency of the data center based upon the recommendation.

2. The method of claim 1, wherein the data comprises information on layout of the data center, information on equipment of the data center, information regarding racking practices in the data center, power consumption by the equipment of the data center, operational parameters of the equipment, temperature and air velocity at various locations of the data center, ambient temperature outside the data center, electricity cost per unit, location of the data center, and combinations thereof.

3. The method of claim 1, wherein the reference data center indicates another data center having previously undergone the method of claim 1 for optimizing the cooling efficiency.

4. The method of claim 1, wherein the second set of metrics comprises at least one of a rack inlet temperature, a tile temperature, rack threshold temperature and a combination thereof, and wherein the rack inlet temperature is associated with a rack, and wherein the tile temperature is associated with a tile placed around the rack, and the rack threshold temperature is associated with safe operation of equipment inside rack.

5. The method of claim 1, wherein the gradual change is feasible to be implemented easily and at a low cost.

6. The method of claim 1 further comprising a step of generating a recommendation report, wherein the recommendation report comprises the inefficiency, the cause, the recommendation, and the scope for optimizing the cooling efficiency of the data center.

7. The method of claim 1 wherein the recommendation report is displayed on an user interface configured to depict the inefficiency and the recommendation corresponding to the inefficiency simultaneously.

8. A system for optimizing cooling efficiency of a data center, the system comprising:
a processor; and
a memory coupled to the processor, wherein the processor is capable of executing a plurality of modules stored in the memory, and wherein the plurality of modules comprising:
an importing module configured to import data comprising a design parameter of the data center and an operational parameter of the data center;
a CFD modeling module configured to leverage a CFD analysis tool in order to develop a Computational fluid dynamics (CFD) model of the data center based upon the data, wherein the CFD model is developed using CFD analysis tool capable of performing CFD calculations based upon the information retrieved from the imported data for various scenarios generated based upon various combinations within the data;
a metrics computation module configured to compute:
a first set of metrics for the data center based upon the data and the CFD model, wherein computing the first set of metrics comprises:
dividing the data center into a plurality of sections, wherein each of the plurality of sections comprises an aisle; and
computing the first set of metrics for each of the plurality of sections based upon the data and the CFD model, wherein the first set of metrics include leakage area in the data center, maximum temperature of racks in the data center, power consumed by equipment in the data center, plenum blockage, flow rate of tiles, maximum and minimum values of set points of cooling equipment, ratio of cooling capacity of the data center and heat generated in the data center and an average ambient temperature, and
a second set of metrics based upon the operational parameter;
a scope determination module configured to:
compare the first set of metrics with reference metrics, where cooling efficiency optimization has been performed, wherein the comparison provides a match set of reference data centers, and wherein ranges of achievable values for the first set of metrics is derived based on after-optimization values of the reference metrics of the match set of the reference data centers, wherein the reference metrics are associated with a reference data center; and
determine a scope for optimizing the cooling efficiency of the data center based upon the comparison of the first set of metrics with the reference metrics, wherein the scope is determined in terms of energy savings in the cooling of the data center;
an identification module configured to:
compare the second set of metrics with threshold values of the data center;
identify inefficiency associated with a current state of the data center based upon the comparing of the second set of metrics with the threshold values and geometrical criteria of the data center, and
determine a cause producing the inefficiency, wherein the cause is determined based upon the data and the inefficiency; and
a recommendation module configured to:
a recommendation module configured to provide recommendation based on the inefficiency and the cause, wherein the recommendation is indicative of suggesting a gradual change in at least one of the design parameter of the data center and the operational parameter of the data center;
data visualization module configured to display the recommendation report and the layout of the data center, wherein at least one section of the layout visually indicates the inefficiency identified; and
facilitate optimizing cooling efficiency of the data center based upon the recommendation.

9. The system of claim 8 further comprising a report generation module configured to generate a recommendation report comprising the inefficiency, the cause, a recommendation, and the scope for optimizing the cooling efficiency of the data center, and wherein the gradual change is feasible to be implemented easily and at a low cost.

10. The system of claim 1 wherein the recommendation report is displayed on a user interface configured to depict the inefficiency and the recommendation corresponding to the inefficiency simultaneously.

11. A non-transitory computer readable medium embodying a program executable in a computing device for optimizing cooling efficiency of a data center, the program comprising:
a program code for importing data comprising a design parameter of the data center and an operational parameter of the data center;
a program code for developing a Computational fluid dynamics (CFD) model of the data center by leveraging a CFD analysis tool based upon the data, wherein the CFD model is developed using CFD analysis tool capable of performing CFD calculations based upon the information retrieved from the imported data for various scenarios generated based upon various combinations within the data;

a program code for computing a first set of metrics for the data center based upon the data and the CFD model, wherein computing the first set of metrics comprises:
  dividing the data center into a plurality of sections, wherein each of the plurality of sections comprises an aisle; and
  computing the first set of metrics for each of the plurality of sections based upon the data and the CFD model, wherein the first set of metrics include leakage area in the data center, maximum temperature of racks in the data center, power consumed by equipment in the data center, plenum blockage, flow rate of tiles, maximum and minimum values of set points of cooling equipment, ratio of cooling capacity of the data center and heat generated in the data center and an average ambient temperature;

a program code for comparing via a processor the first set of metrics with reference metrics, where cooling efficiency optimization has been performed, wherein the comparison provides a match set of reference data centers, and wherein ranges of achievable values for the first set of metrics is derived based on after-optimization values of the reference metrics of the match set of the reference data centers, wherein the reference metrics are associated with a reference data center;

a program code for determining a scope for optimizing the cooling efficiency of the data center based upon the comparison of the first set of metrics with the reference metrics, wherein the scope is determined in terms of energy savings in the cooling of the data center;

a program code for computing a second set of metrics based upon the operational parameter;

a program code for comparing the second set of metrics with threshold values of the data center;

a program code for identifying inefficiency associated with functioning current state of the data center based upon the comparing of the second set of metrics with the threshold values and geometrical criteria of the data center;

a program code for determining a cause producing the inefficiency, wherein the cause is determined based upon the data and the inefficiency;

a program code for providing a recommendation based on the inefficiency and the cause, wherein the recommendation is indicative of suggesting a gradual change in at least one of the design parameter of the data center and the operational parameter of the data center;

a program code for displaying the recommendation report and the layout of the data center, wherein at least one section of the layout visually indicates the inefficiency identified; and a program code for facilitating optimizing cooling efficiency of the data center based upon the recommendation.

* * * * *